S. P. Babcock,
Snap Hook.
Nº 42,634.      Patented May 10, 1864.

Witnesses:
J. W. Coombs
Henry Morris

Inventor:
S. P. Babcock
Per Munn & Co.
Attorneys

UNITED STATES PATENT OFFICE.

S. P. BABCOCK, OF JORDAN, NEW YORK.

IMPROVED HARNESS-HOOK.

Specification forming part of Letters Patent No. 42,634, dated May 10, 1864.

*To all whom it may concern:*

Be it known that I, S. P. BABCOCK, of Jordan, in the county of Onondaga and State of New York, have invented a new and Improved Harness-Hook; and I do hereby declare that the following is a full, clear, and exact description of the same, reference being had to the accompanying drawings, making a part of this specification, in which—

Figure 1:
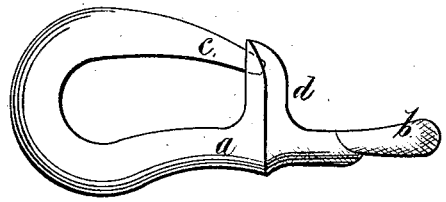
Figure 2:
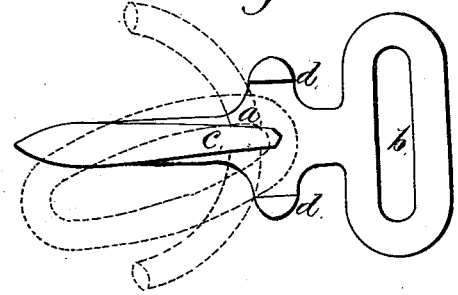

Figure 1 is a side view of my invention; Fig. 2, a face view of the same.

Similar letters of reference indicate corresponding parts in the two figures.

This invention consists in providing the harness-hook with two lips or guards applied to the shank of the hook and opposite the point of the same, as hereinafter described, whereby the ring can only be fitted in the hook when the former is turned edgewise, and thus prevented when in the hook from being casually detached therefrom.

To enable those skilled in the art to fully understand and construct my invention, I will proceed to describe it.

The body of the hook may be of the usual form, $a$ being the shank, $b$ the eye in which the strap is secured, and $c$ the hook. These parts do not require a special description, as they do not or need not differ materially, if any, from an ordinary hook.

The shank $b$ is provided with two lips or guards, $d\ d$, one at each side. These lips or guards project from the shank $a$ toward and past the point of the hook, a space being allowed between the hook and the lips or guards $d\ d$ to admit of the insertion of a ring edgewise, so that it may be fitted on the hook, as will be understood by referring to Fig. 2.

By this arrangement it will be seen that the ring cannot be casually detached from the hook without turning in an edgewise position, and, as this cannot occur accidentally, a sure connection is obtained, the lips or guards effectually preventing the ring from slipping off from the hook.

This hook may be used on any of the straps of a harness which require to be connected together and disconnected from time to time, as, for instance, bridle and other straps. It may also be used for connecting traces to whiffletrees.

Having thus described my invention, I claim as new, and desire to secure by Letters Patent, as an improved article of manufacture—

A harness-hook having its shank $a$ provided with lips or guards $d\ d$, arranged relatively with the hook $c$, substantially as and for the purpose herein set forth.

S. P. BABCOCK.

Witnesses:
NICHOLAS CRANER,
M. S. HOVEY.